(12) United States Patent
Huang et al.

(10) Patent No.: US 9,037,883 B2
(45) Date of Patent: May 19, 2015

(54) APPARATUS, METHOD, AND SYSTEM FOR IMPROVED POWER DELIVERY PERFORMANCE WITH A DYNAMIC VOLTAGE PULSE SCHEME

(71) Applicant: Intel Corporation, Santa Clara, CA (US)

(72) Inventors: Lilly Huang, Portland, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/020,364

(22) Filed: Sep. 6, 2013

(65) Prior Publication Data
US 2014/0059362 A1    Feb. 27, 2014

Related U.S. Application Data

(62) Division of application No. 12/963,845, filed on Dec. 9, 2010, now Pat. No. 8,539,262.

(51) Int. Cl.
| | |
|---|---|
| G06F 1/00 | (2006.01) |
| G06F 1/32 | (2006.01) |
| G01R 15/00 | (2006.01) |
| B23K 11/24 | (2006.01) |
| G06F 1/26 | (2006.01) |
| G06F 3/02 | (2006.01) |

(52) U.S. Cl.
CPC ... *G06F 1/26* (2013.01); *G06F 3/02* (2013.01)

(58) Field of Classification Search
CPC .................................... G06F 1/26; G05F 3/02
USPC ...................... 713/300, 320; 323/318; 702/57
See application file for complete search history.

(56) References Cited

U.S. PATENT DOCUMENTS

| | | | |
|---|---|---|---|
| 6,118,676 A | 9/2000 | Divan et al. | |
| 6,446,212 B1 | 9/2002 | Smit et al. | |
| 6,978,388 B1* | 12/2005 | Cornelius | 713/320 |
| 7,421,604 B1* | 9/2008 | Mimberg | 713/340 |

(Continued)

FOREIGN PATENT DOCUMENTS

| | | |
|---|---|---|
| JP | 2005-514800 A | 5/2005 |
| JP | 2005-310060 A | 11/2005 |
| JP | 2007-236124 A | 9/2007 |

(Continued)

OTHER PUBLICATIONS

International Search Report received for PCT Patent Application No. PCT/US2011/062221, mailed on Jun. 19, 2012, 5 pages.

*Primary Examiner* — Stefan Stoynov
(74) *Attorney, Agent, or Firm* — International IP Law Group PLLC

(57) ABSTRACT

An apparatus and method is described herein for providing a dynamic pulse scheme for a voltage supply. A load (current) demand event of a processor is either predicted and/or detected. In response to the current demand event, such as a change in the current demand; a temporary, transient voltage pulse is generated by a voltage supply to compensate for the current transient demand. As result, dynamic voltage supply pulses generated based on the load current or the prediction of the load current demand increases performance, decreases power consumption, and saves expensive addition of compensation components, such as capacitors to a processor package.

13 Claims, 9 Drawing Sheets

(56) References Cited

U.S. PATENT DOCUMENTS

| | | |
|---|---|---|
| 7,439,718 B2 | 10/2008 | Rozen et al. |
| 7,441,137 B1 * | 10/2008 | Mimberg .................. 713/340 |
| 2006/0020838 A1 | 1/2006 | Tschanz et al. |
| 2006/0123256 A1 | 6/2006 | Cornelius |
| 2007/0075692 A1 * | 4/2007 | Ostrom et al. ............... 323/274 |
| 2010/0281279 A1 | 11/2010 | Huang et al. |

FOREIGN PATENT DOCUMENTS

| | | |
|---|---|---|
| WO | 02/093341 A2 | 11/2002 |
| WO | 2012/078386 A2 | 6/2012 |
| WO | 2012/078386 A3 | 8/2012 |

* cited by examiner

APPARATUS, METHOD, AND SYSTEM FOR IMPROVED POWER DELIVERY PERFORMANCE WITH A DYNAMIC VOLTAGE PULSE SCHEME

CROSS-REFERENCE TO RELATED APPLICATION

This application is a divisional of U.S. patent application Ser. No. 12/963,845, filed Dec. 9, 2010 (now U.S. Pat. No. 8,539,262), the entire contents of which are hereby incorporated by reference as though fully set forth herein.

FIELD

This invention relates to the field of integrated circuits and, in particular, to improving power delivery.

BACKGROUND

Advances in semi-conductor processing and logic design have permitted an increase in the amount of logic that may be present on integrated circuit devices. As a result, the power demands of integrated circuits, such as microprocessors, have drastically increased. As a remedy, many processors now support multiple power/operating states. And the transitions between performance states often cause large variations on the voltage supply when the current demand of processors similarly fluctuates. As an example, in a very short period processor current demand may transition from 1× to 50× due to these operating/performance state transitions. Here, the voltage supply is severely degraded—large overshoot or undershoot from nominal voltage—as a consequence of the current demand transitions.

Typically there have been two approaches to handling this voltage supply degradation. In one post-design scenario, a large amount of decoupling capacitors are added to a processor package and/or motherboard to reduce voltage droops. Yet, adding capacitors is both monetarily expensive and physically expensive (the capacitors take up additional critical signal routing/placement space). In a second, pre-design scenario, processor designers take into account the voltage supply issues by adding a guard-band (a tolerance band that the processor still operates appropriately). However, an increase in guard-band both results in an additional power losses and performance degradation, since the designers are constrained by designing to worst case scenarios.

For example, FIG. 2 illustrates an embodiment of a change in current demand. At 205, an increase in current demand of a processor occurs. As a result, the voltage supply, in reaction to the increase in current demand, undershoots (or droops) at 210. Here, the operating voltage of a processor is decreased. And the performance of the processor is similarly decreased. In addition, at 215, the current demand is decreased, which results in overshoot 220. The change in magnitude between undershoot 210 to overshoot 220 is often referred to as guard band 225. And as described above, as guard-band 225 increases the use of capacitors or worst case design increases, which potentially results in more cost, less routing space, degraded performance, and greater power consumption.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor configurations, specific power states, specific hardware structures, specific table formats, specific voltages, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described algorithms, specific voltage regulator details, and other specific operational details of processors haven't been described in detail in order to avoid unnecessarily obscuring the present invention.

The method and apparatus described herein are for providing a dynamic voltage pulsing scheme to improve power delivery performance. Specifically, the dynamic pulsing scheme is discussed with regard to supplying voltage to microprocessors. Yet, the apparatus' and methods described herein are not so limited, as they may be implemented in conjunction with any power supply for a device, or parts thereof. For example, the dynamic pulsing scheme may be utilized on-die of a processor throughout a power distribution network for improved power delivery to specific units or cores of the processor, instead of to an entire processor. Or the dynamic pulsing scheme may be utilized in embedded, small form-factor devices, such as PDAs and cell phones.

Figure 1:
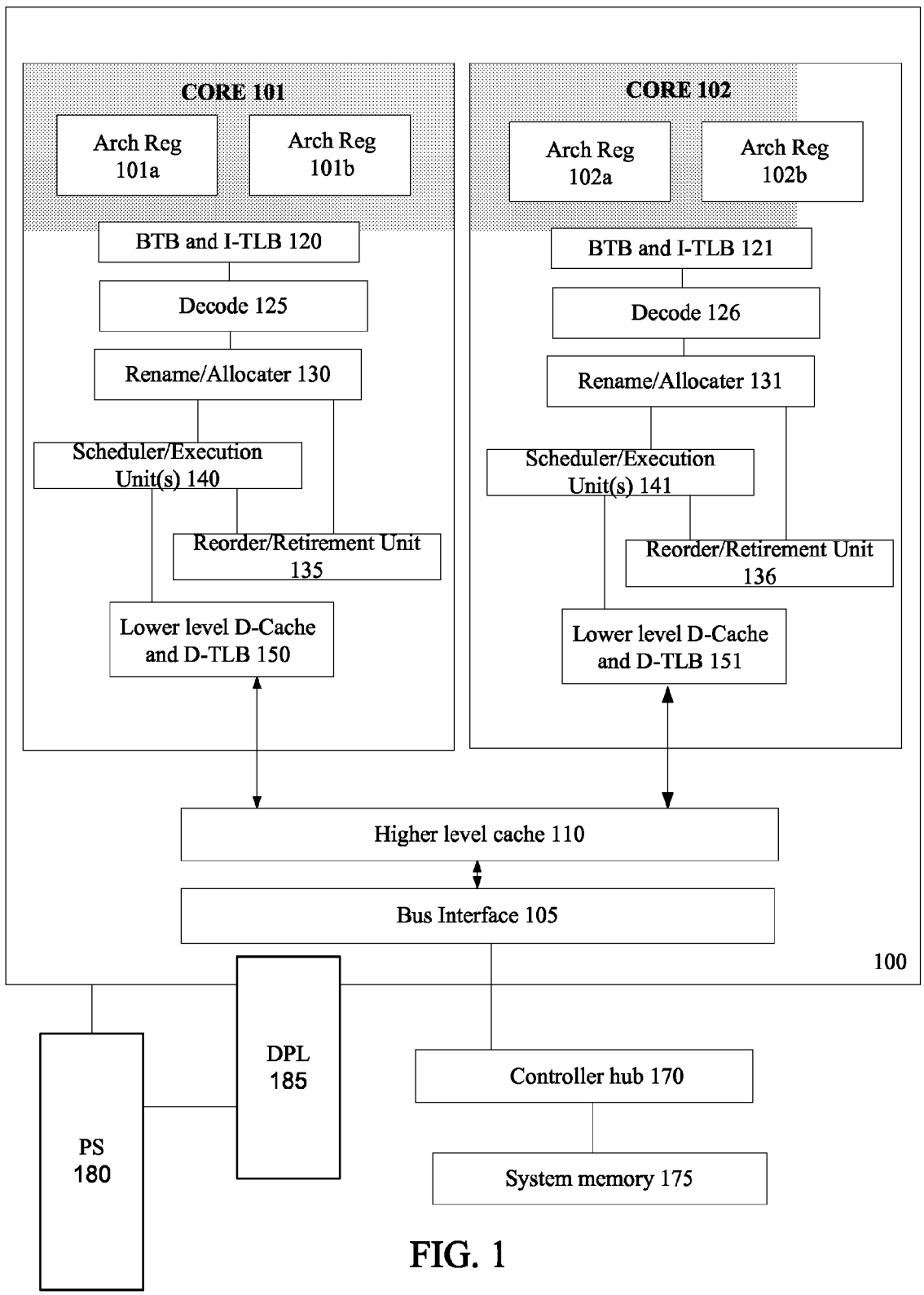
FIG. 1 illustrates an embodiment of a logical representation of a multiprocessing element processor.
Figure 2:
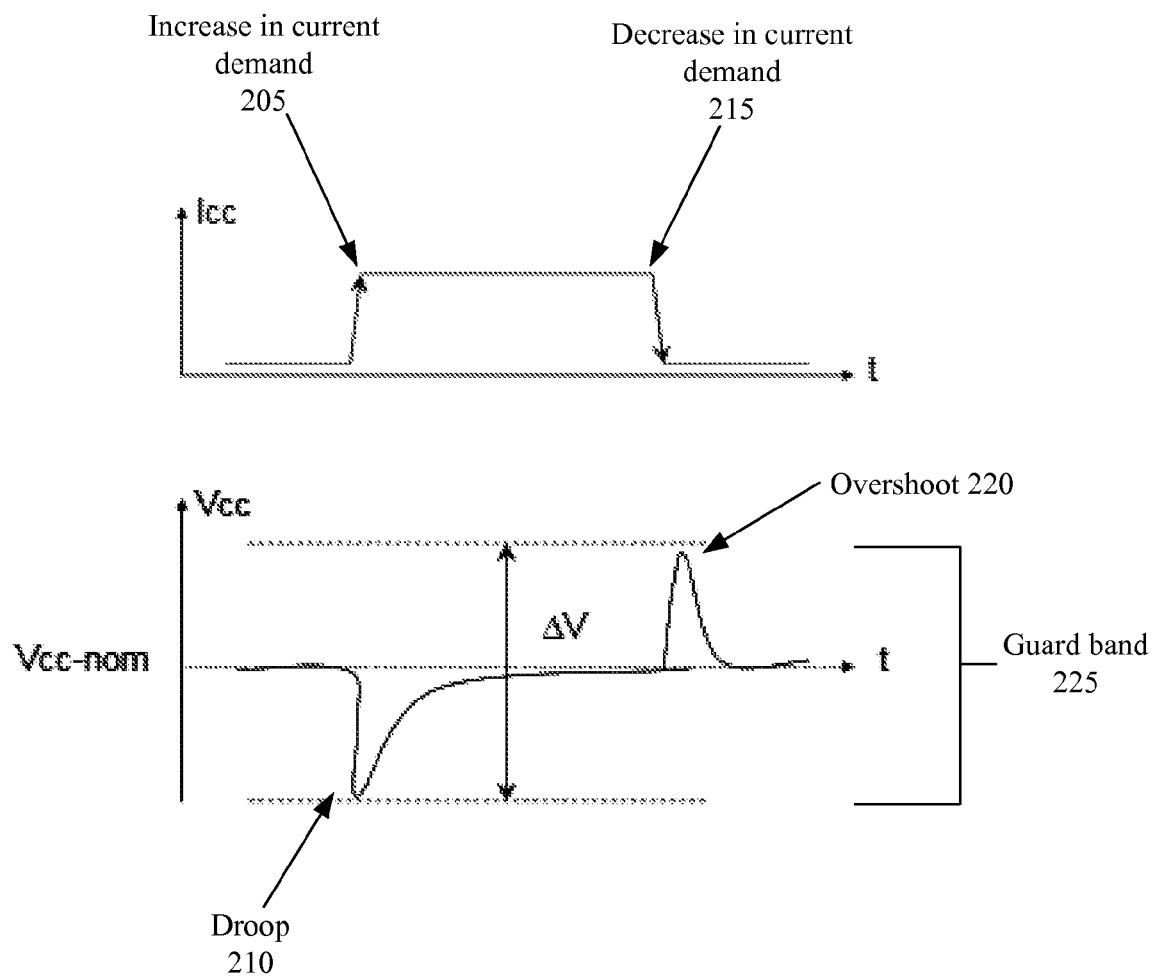
FIG. 2 illustrates an embodiment of an effect on a voltage supply in response to a current demand.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102, which may include asymmetric cores or symmetric cores (illustrated embodiment). However, processor 100 may include any number of processing elements that may be symmetric or asymmetric.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in rename allocater logic 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/ resources of a processor is illustrated. Note that a processor may include, or omit, any of these functional units, as well as include any other known functional units, logic, or firmware not depicted. As illustrated, core 101 includes a simplified, representative out-of-order (OOO) processor core. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific, new instructions, such as a conditional commit instruction and/or a speculative checkpoint instruction. As a result or the recognition by decoders 125, the architecture or core 101 takes specific, predefined actions to perform tasks associated with the appropriate instruction.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

As illustrated, power supply 180 is to provide voltage (some also refer to as power or current) to processor 100. And in one embodiment, as the current demand of processor 100 varies (either through change of a workload, change of a power state, or other change in load demand), power supply 180, in conjunction with dynamic pulse logic 185, is to provide dynamic pulses in supplied voltage to compensate for the variations in current demand. For example, when a transient load event (indicator of a change in current demand) is detected, dynamic pulse logic 185 provides the specifications for a pulse to power supply 180. And power supply 180 generates the pulse according to the provided specifications to compensate for the effects of a current demand transition. Note that a pulse, such as a transient pulse, in one embodiment, refers to a supplied voltage level away from a nominal (normal, baseline) voltage for a temporary amount of time; this is to be distinguished from a non-temporary change in supplied voltage, which is to change the nominal or baseline voltage (i.e. a change that is intended be permanent until a next change to the nominal voltage).

For example, as a load demand of processor 100 transitions from low to high, a pulse of a magnitude above nominal voltage level is provided. As a specific illustrative example, if a nominal or baseline voltage supplied to processor 100 is 1V, then a pulse of a magnitude above nominal voltage level, such as 100 mV, results in a total supplied voltage of 1.1V for the duration of the pulse. The 1.1 V total may be obtained in any known manner of raising a voltage level from 1 to 1.1V. But as an example, where Voltage Identifier (VID) bits are used to set the nominal voltage, the VID bits are changed to represent a nominal voltage of 1.1V for the duration of the pulse. And then the VID bits are returned to the nominal 1V configuration without any official request for the return according to the normal VID protocol. Therefore, when the undershoot occurs from the change in current demand, it is from the temporarily raised voltage level, which results in a voltage level that is closer to nominal than a previous, non-pulsing scheme. Essentially, the voltage level supplied to the process is dynamically and temporarily adjusted based on a load demand feedback loop from the processor to the voltage supply.

As depicted in FIG. 1, dynamic pulse logic 185 crosses the logical boundaries of processor 100. Here, dynamic pulse logic 185 may have portions, such as logic for detecting/predicting a change in current demand, within processor 100 and other portions external to the processor, such as the logic for providing specifications for the pulse to voltage supply 180, may be located off processor 100. Yet, any portion of the feedback loop may be placed anywhere (on processor 100, off processor 100, or a combination thereof as discussed above). Furthermore, the discussion above and below primarily focuses on dynamic pulsing in a voltage supply to a processor. Yet, processor 100, in another embodiment, may include a similar dynamic pulsing scheme for cores or units thereof. For example, core 101 and 102 may be capable of operating in independent power states or have different workloads. So, a similar pulsing scheme, as described herein, may be utilized in the voltage distribution to the independent cores. Moreover, as individual units, such as a trace cache or branch predictor, are powered down, dynamic pulsing may also be utilized at the unit or logic level to compensate for such local changes in current demand.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type.

FIG. 1 illustrates an embodiment of processor that is coupled in a point-to-point fashion with an interface to an external memory controller (controller hub 170). However, many current processors have begun including an on-processor memory interface module—an on-chip module—with a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor.

Figure 3:
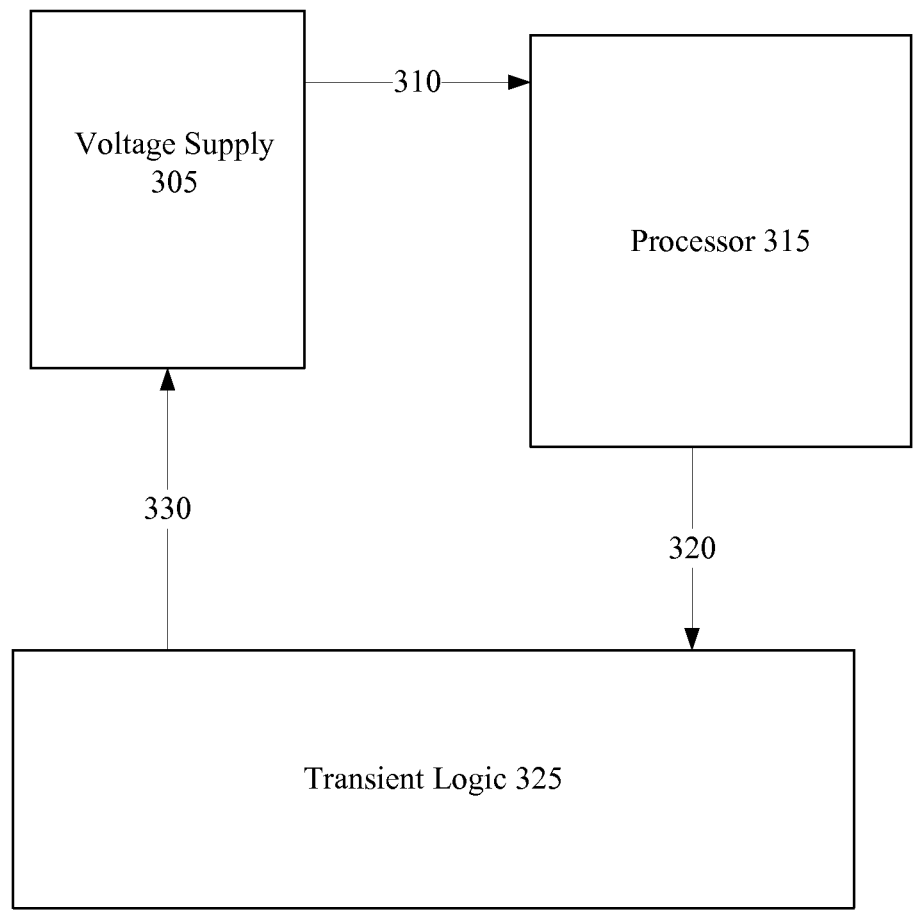
FIG. 3 illustrates an embodiment of a logical representation of a dynamic voltage supply pulse scheme to compensate for transient current variations of a processor.

Turning to FIG. 3, an embodiment of a logical representation of modules for providing dynamic pulses to compensate for changes in current demand of a processor is illustrated. Voltage supply 305 is to supply voltage 310 to processor 315. Voltage supply 305 includes any known hardware, module, or electronic component that is capable of providing a voltage, such as a power supply, voltage regulator, power distribution module, power gating module, voltage rail, voltage identification unit, close loop feedback control unit to regulate the output voltage supplying to a load etc.

In one specific illustrative embodiment, voltage supply 305 includes a voltage regulator (VR) to provide any one of a plurality of voltages to processor 315. Often this design utilizes Voltage Identification Digital (VID) bits to identify a voltage of the plurality of voltages that is to be supplied to the processor. Therefore, when a storage element is updated (often by the processor or other power unit) with new VID bits, the voltage supply updates supplied voltage 310, accordingly. For example, when eight VID bits (or digital signal lines) are utilized, one of 256 unique voltage levels may be identified by the VID bits. So if a voltage ranges from 0 to 1.5V, in this example, voltage levels may be broken into 6 mV intervals. Note that the description of VR 305 and processor 315 is an illustrative embodiment. In another scenario, processor 315 is replaced by a core or unit of a processor. And voltage supply 305 includes logic that is to distribute voltage/power to the core/unit.

In one embodiment, transient logic 325 is to provide a feedback loop (320, 325, 330) between processor 315 and voltage supply 305, where dynamic pulses are generated by voltage supply 305 to compensate for load demand changes in processor 315 as indicated by the feedback loop. As an example, transient control logic 325 is adapted to receive a transient load event indicator (any indicator of any change that affects the supply voltage, such as a change in load/current demand) from processor 315. Examples of such a transient event includes a measured variation in current demand by the device, an indication of a power state transition of the device, and an indication that current demand of the device is going to change (a prediction).

In the first exemplary scenario (measured variation in current demand), the change in load/current demand may represent any number of changes within a device, such as processor 315. As an example, the change in current demand of a processor may represent a change in power state, a change in workload, or any other change in current usage. As a result, any known apparatus or method for measuring a change in current (load) demand may be utilized. For example, a sensor is utilized to measure a change in current or voltage at any point associated with the processor. In fact, although the feedback loop is shown as starting from processor 315. The change in demand of processor 315 may instead be measured at voltage supply 305 by measuring the effect of a change in demand of processor 315 on the actual voltage supplied by voltage supply 305. Even though current demand is not directly measured at, and then signaled from, processor 315 in this example, the feedback loop is still logically started at processor 315, because the measurement at voltage supply 305 is a representation of the effect from the change processor 315's load.

As described above, a dynamic pulse scheme, in some embodiments, applied at a per unit/per core basis. Yet, where a change in current demand is measured/determined for an entire processor (processor 315), the dynamic pulse scheme is potentially more of a catch-all implementation. As an example, if one core of an eight core processor enters an active/working power state from a deep sleep state, the current demand increases. Here, a dynamic pulse may be generated at the core to compensate for the change in demand. Yet, the entire current demand of the processor may or may not change depending on the rest of the processor workload. So, if the entire workload stays the same, then no undershoot occurs in the overall voltage supply. And no performance degradation occurs for the entire processor. Therefore, depending on the implementation the dynamic pulse scheme (measurement and generation) may be implemented at any granularity of the processor (entire processor, per core, per thread, per unit, per logic module, per transistor, etc).

In the second exemplary scenario of a transient event (an indication of a power state transition), any known apparatus or method for detecting or predicting a power state transition may be utilized. In one embodiment, a software entity (Operating System or user-program) requests that processor 315 (or a section thereof) to transition between power states. The Advanced Configuration and Power Interface (ACPI) specification currently defines a number of different levels of powers states, such as global power states, device states, and processor states. And as a device, such as processor 315, transitions between these power states, the demand of processor 315 often changes as well. In one embodiment, such changes are controlled and/or coordinated through a processor power management/control unit Therefore, the transient event may include any event between issuing or detecting the request from the software entity up to and including the actual transition between power states. Although a software request for power state transition is discussed immediately above, a hardware initiated transition between power states may be similarly considered a transient event.

Once a transient event is detected (a transient event indicator is received by transient logic 325), then transient event logic 325 provides the appropriate specifications for a dynamic pulse to voltage supply 305 as compensation for the transient event. Specifications for a pulse may range from pulse magnitude/amplitude to duration, start time, delay, period, other wave characteristic, or a combination thereof. In one embodiment, transient logic 325 provides the same pulse specifications in response to the same transient events. For example, transient logic 325 is adapted to hold a pulse table with entries indexed by transient events. Each of the transient events, in this example, are associated with the specifications of a pulse that are to be provided to voltage supply 305. Therefore, when a transient event indicator referencing a transient event is received by transient logic 325, then the corresponding entry that references the transient event is located. And the associated specifications for a pulse are provided to voltage supply 305.

To provide an illustrative example, an entry of a lookup table may include a transient event associated with a pulse voltage level (pulse magnitude), an amount of time to sustain the pulse (pulse duration), a start time of the pulse, an amount of delay for the pulse, or a combination thereof. Note that the specifications for a pulse may be absolute, such as the total voltage magnitude of a pulse, or relative, such as incrementally added to either the nominal voltage or other entries. To provide even more illustrative specificity, assume there are seven power states for processor 315. And that processor 315 may transition from any single power state to any other power state. Here there may be 5040 entries (an entry for each possible transition) in the table with absolute values for specifications, such as magnitude.

Alternatively, there may be seven entries for each power state with relative magnitude values. And as a power state transition passes through each power state entry, the magnitudes are summed. For example, if each power state is associated with a 20 mV magnitude, then a transition from the highest power state to the lowest power state would result in a pulse magnitude of 140 mV (7 states*20 mv). Note that even this summed magnitude may be relative to the nominal voltage. So, if the supplied voltage is 1V, then the pulse magnitude results in a total supplied voltage 310 of 1.14V for the duration of the pulse. As can be seen from these examples, transient logic 325 may use any known representation of a magnitude that may be utilized to generate an absolute pulse voltage with voltage supply 305. And each individual power state or current demand transition may include different relative or absolute specifications.

Similarly, a duration of a pulse is not limited to just a period of time supplied to voltage supply 305. In one embodiment, voltage supply 305 is merely a voltage regulator to supply the voltage identified by VID bits. In this example, supply a representation of duration to voltage supply 305 would do nothing. Instead, transient logic 325 may hold VID bits (either absolute or relative) for pulse/voltage magnitude along with a duration. Continuing the example from above, voltage supply 305 initially generates voltage 310 at 1V based on VID bits. A transient event is detected by processor 315. And a transient event indicator 320 is provided to transient logic 325. Transient logic 325, in this example, looks up an entry associated with the transient event and determines a pulse of 140 mV above nominal is to be provided for 100 cycles. Based on the entry, transient logic 325 provides new VID bits to voltage supply 305 that causes voltage supply 305 to provide voltage 310 at 1.14V. Upon 100 cycles (after a counter or other logic indicates the expiration of 100 cycles), transient logic 325 provides the original VID bits to cause voltage 310 to return to the nominal 1V.

In addition to the duration of the pulse, a start time for the pulse may be associated with a transient event. Here, a change in current demand (the transient event) may be predicted, so the change in supply voltage (the pulse), in one embodiment, is generated to coincide with the start of the transient event. For example, when a request for a power state transition is received, there may be an amount of delay time between receiving the request and the actual power state transition. So, the pulse to compensate for the change in load demand may similarly be delayed. Note that the start time may refer to an absolute time, a relative delay time, or association with a corresponding event.

The discussion immediately above has been in reference to generating a consistent dynamic pulse for each transient event (same input, same output). However, in one embodiment, the pulse in voltage 310 is dynamically tuned to compensate for the change in load. In one embodiment, the specification for a pulse is tuned over multiple pulses. Here, a default or baseline pulse may be initially generated for a specific transient event. And the effect on voltage 310 during the pulse and transient event is determined. The dynamic pulse specifications are updated based on the determined effect. Upon subsequently encountering the same transient event, the new, updated specifications for the pulse are provided to the voltage supply. As an illustration, the specifications for a pulse in a table from the example above may be updated upon determining the effect on supplied voltage 310. In another embodiment, the pulse is dynamically tuned at the time of the pulse. Here, the pulse may be continuously dynamically increased/decreased until the desired effect on supplied voltage is achieved.

Figure 4:
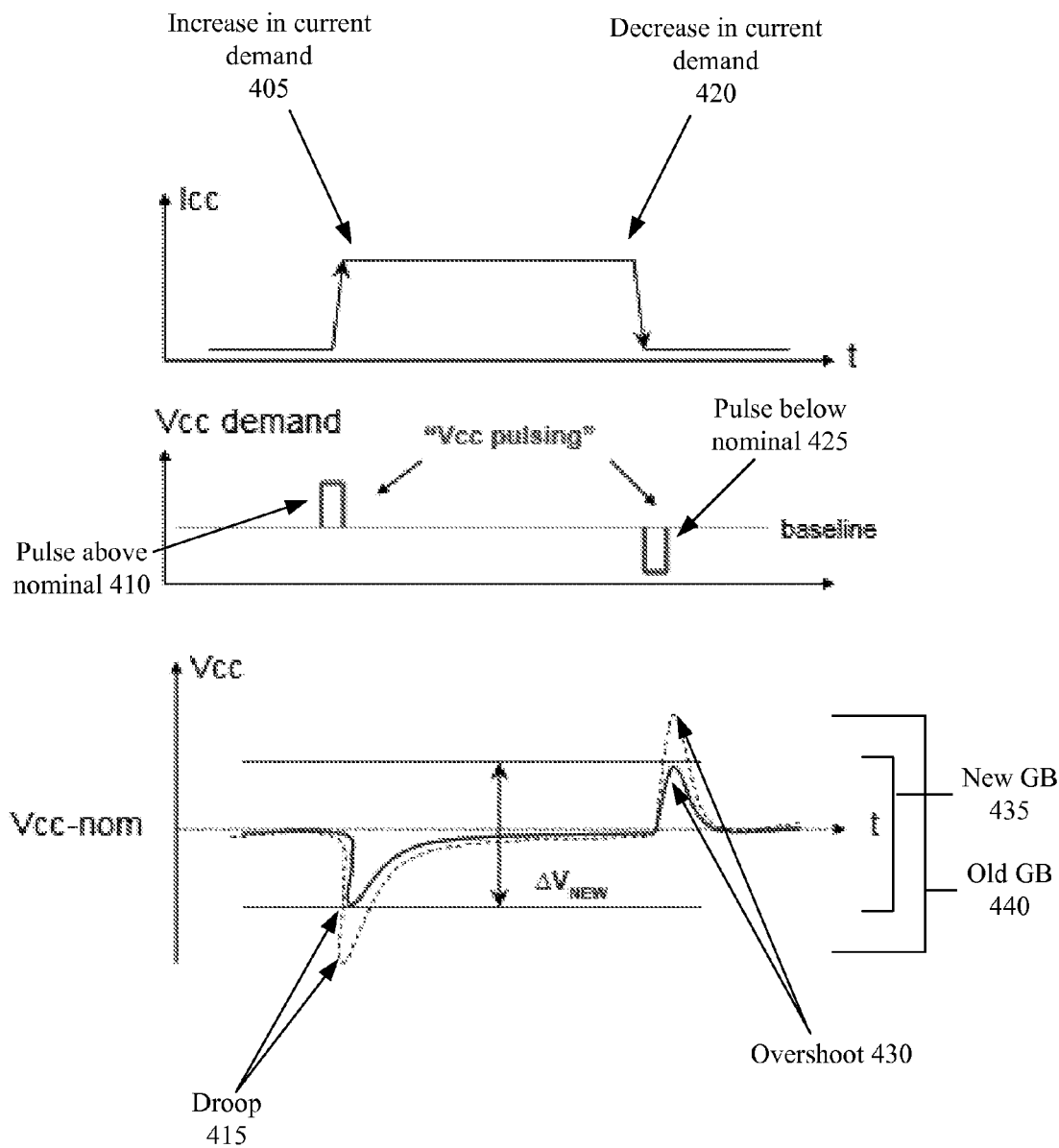
FIG. 4 illustrates an embodiment of an effect on a voltage supply in response to a current demand utilizing a dynamic voltage supply pulse scheme.

Referring to FIG. 4, an embodiment of graphs illustrating the effect of a dynamic pulsing scheme is illustrated. The discussion below may apply to any version of a dynamic pulse scheme. However, to further the illustration the description focuses on the illustration in FIG. 3. Here, a supplied voltage (voltage 310) is provided by voltage supply as nominal voltage 401 (e.g. 1V). At event 405, an increase in current demand (a transient event) of processor 315 occurs. In response to the transient logic 325 determining the transient event is to occur (either by a prediction or actual measurement), a dynamic pulse 410 (e.g. 100 mV) is provided by voltage supply 305 above nominal voltage 410 (e.g. total voltage of 1.1V) to compensate for the increase in current demand by processor 315.

As illustrated, dynamic pulse 410 is above the original nominal voltage 401. However, in another embodiment, the transient event may include a power state transition, where nominal voltage level (e.g. 0V) is to be stepped up, such as from 0V to 1V. Note this step is not a transient, dynamic pulse, but rather a sustained change in the nominal voltage. Here, the pulse may not be above the previous nominal voltage (e.g. 0V), but rather above the new nominal voltage (e.g. 1V) to obtain a total supplied voltage (e.g. 1.1V).

From the illustration, it can be seen that the increased pulse 410 above nominal voltage decreased the droop/undershoot in the actual supplied voltage at 415. Similarly, when current demand decreases at 420, a pulse below nominal 401 is generated at 425. And the overshoot at 430 is decreased. As a result, the old guard-band 440 is significantly reduced to new guard-band 435. With the reduction in guard-band all the aforementioned disadvantages of a large guard-band (addition of expensive capacitors, increased power consumption, and reduced performance) are also significantly improved by the dynamic pulse scheme.

Figure 5:
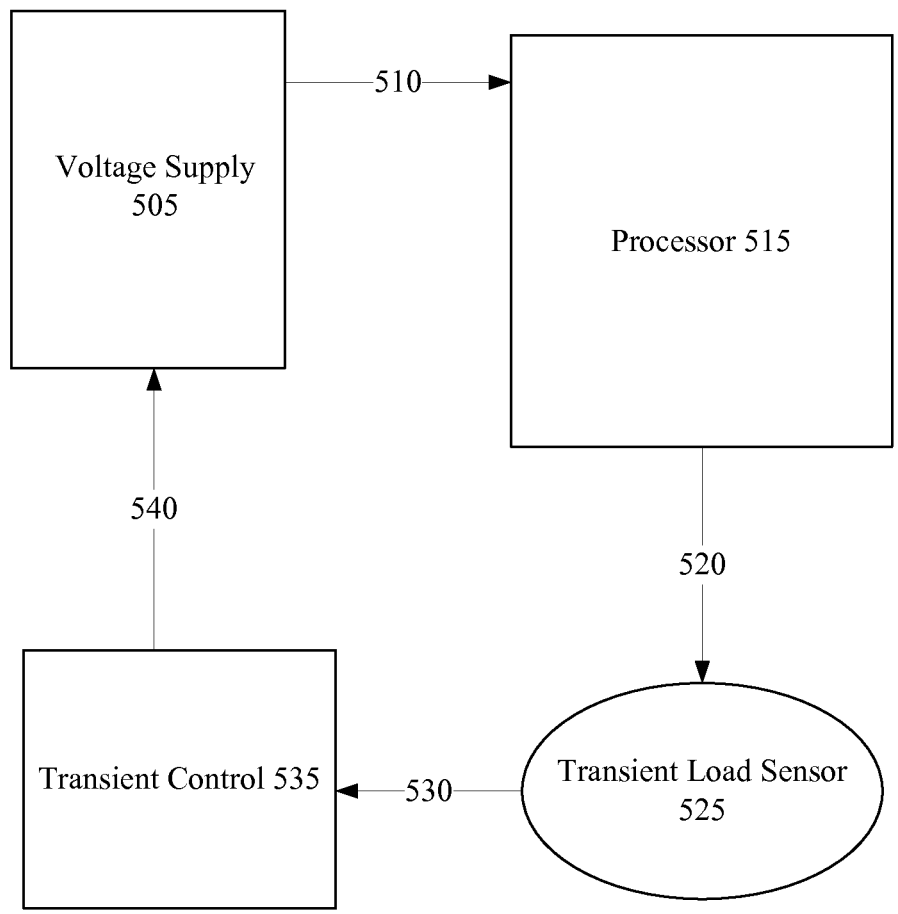
FIG. 5 illustrates another embodiment of a logical representation of a dynamic voltage supply pulse scheme to compensate for transient current variations of a processor.

Turning to FIG. 5, another embodiment of a logical representation of a dynamic voltage supply pulse scheme to compensate for transient current variations of a processor is depicted. As above (FIG. 3), voltage supply 505 is to supply voltage 510 to processor 515. In one embodiment, transient control 535 is adapted to cause voltage supply 505 to generate a dynamic pulse to compensate for a change in load of processor 515 as detected by transient load sensor 525. Transient load sensor 525 includes any known logic and/or method known for detecting a change in load/current. As a first example, transient load sensor 525 measures a change in current demand over time. In another example, sensor 525 measures the change in demand through a change in voltage 510. In other words, the change in demand of processor 315 affects voltage 510 (undershoot and overshoot). And the effect on voltage 510 represents the change in demand.

Once transient load sensor 525 measures the change in load of processor 515, transient control 535 causes voltage supply 505 to generate the dynamic pulse, which is based on the measured change in load. As an example, the combination of transient control 535 and voltage supply 505 dynamically tunes a generated pulse based on the load of processor 515 to more efficiently compensate for the change in load. In another example, where sensor 525 measures the change in demand (e.g. change in current) over time, transient control 535 causes voltage supply 505 to generate a pulse in voltage 510 that is a function of the measured change in current over time. And as described above, transient control logic 535, in one embodiment, is adapted to hold a lookup table. In this scenario, the lookup table may hold changes in load/current demand associated with pulse specifications (amplitude/magnitude, duration, etc.).

Note that detection of a change in current and pulse generation may occur immediately. In other words, when a start in a change of current demand is first detected by transient load sensor 525, a pulse is generated in voltage 510. And as the change in current demand increases/decreases, so does the pulse magnitude. As a specific example, assume a power state transition causes processor 515 to increase current demand. At the start of measuring the change in current demand (e.g. an initial change of X amount of current), an initial pulse is generated in voltage 510. And as the current demand continues to increase (increases beyond Y amount of current), another, higher magnitude pulse is generated. Essentially, a plurality of change in demand thresholds enable a stepped pulse to by dynamically generated, as the change in demand is occurring. However, generating a dynamic pulse is not limited to immediate generation (generation of a pulse as soon as possible taking into account normal delay through logic/units for signal propagation and computation). Instead, there may be an associated delay added. Or the measured change in current demand may be measured over time and utilized for prediction of current demand changes in the future, as described immediately below.

Figure 6:
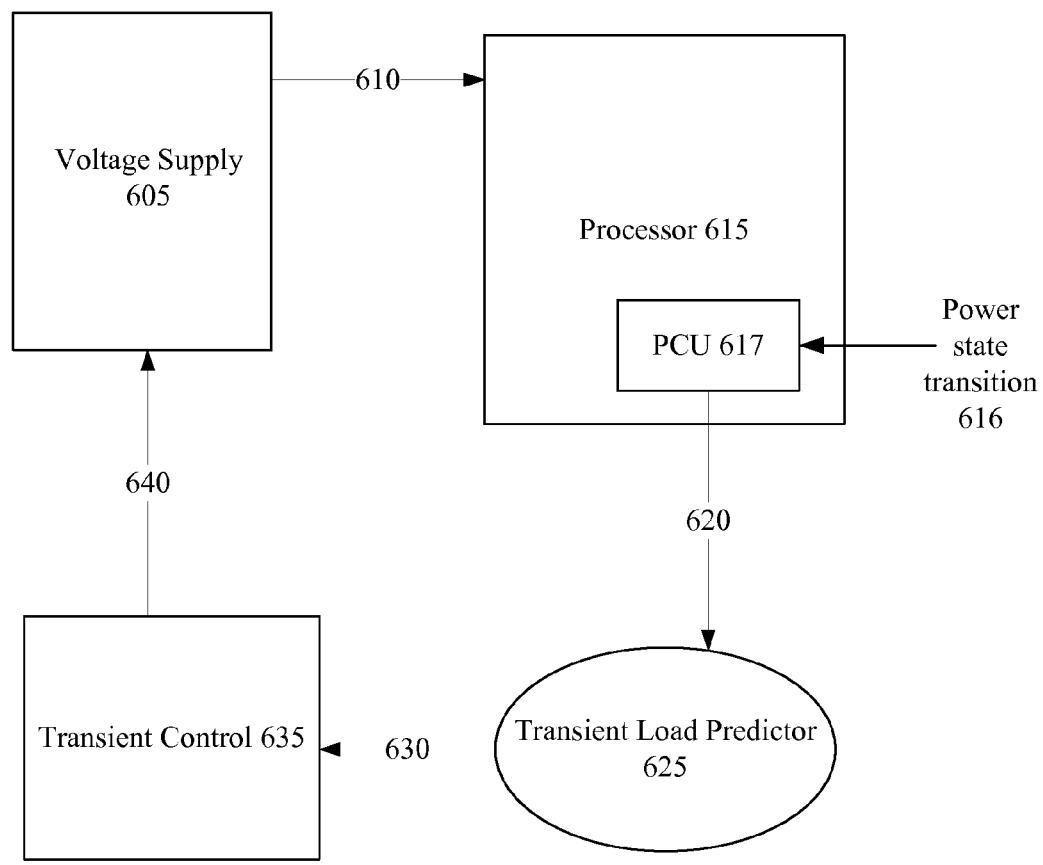
FIG. 6 illustrates another embodiment of a logical representation of a dynamic voltage supply pulse scheme to compensate for transient current variations of a processor.

Referring now to FIG. 6, another embodiment of a logical representation of a dynamic voltage supply pulse scheme to compensate for transient current variations of a processor is depicted. The discussion in reference to FIG. 5 has been primarily in reference to actually measuring a change in demand and compensating for that demand through dynamic pulse generation. However, in one embodiment, a pro-active approach to dynamic pulse generation is taken.

Here, load predictor 625 is to predict a change in load demand of processor 615. Prediction of a change in load demand may be performed by any known method for determining a change in current is to occur. For example, code or execution profiling may indicate a change in workload that is to result in a change in demand of the processor; in fact, software itself may provide hints to such an end. As another example, actual past changes in current demand by processor 615, as profiled by predictor 625, are utilized to predict future changes in current demand. Additionally, a prediction may include a more straightforward approach. For example, when a request from a software entity for processor 615 to transition between power states is received, the detection of the request, in one embodiment, is considered a prediction of a change in demand for when the processor actually transitions between power states.

To further this example, FIG. 6 depicts one embodiment of such a prediction based on a request for a power state change. Here, a power control unit 617 is to receive a request 616 for a power state transition. The request may be a hardware generated request (interrupt, etc) or a request by a software entity (Operating System, kernel, Virtual Machine Control Structure (VMCS), application, or other software entity). When received, the PCU 617 informs transient load predictor 625 of the request. Note that predictor 625 may be informed by PCU 617 by an explicit signal/indicator. Or predictor 625 may monitor requests to PCU 617, so no extra signals transmitted. Regardless, once the request is detected, loop 625, 635, and 605 takes the steps to generate the dynamic transient pulse to compensate for the power state change.

Transient control logic 635 may operate in a similar manner as described above. And since predictor 625 is predicting a future change in current demand, then any table or other storage structure for holding specifications for a pulse, in one embodiment, includes a start time (or a delay from a current time) for the pulse to begin. Here, the start time, which may include a time, an event, or a combination thereof, ideally approximates the start of the current demand change, so the pulse coincides with the change in current demand.

To further the discussion of operation of transient control 635, in one embodiment mentioned above, the transient pulse is dynamically tuned to provide optimal compensation for the change in current demand. In the discussion above, the tuning was discussed in reference to a dynamic change in the pulse as the current demand changes. However, in another embodiment, specifications of the transient pulse may be tuned based on their efficiency in compensating for past changes in current demand. Here, pulses are generated at different magnitudes based on their efficacy in normalizing voltage 610 during current demand changes. And by adjusting the specifications (magnitude, duration, start time, etc.), over time an optimal specification for a dynamic pulse may be obtained.

As an example, assume that during a transition from a C3 (sleep power state) to a C0 (full operation state), a dynamic pulse of 100 mV (e.g. 1.1V over the nominal 1V) is generated for 100 cycles to compensate for the power state transition. Yet, an undershoot of 50 mV (e.g. 0.95V as compared to the expected nominal of 1V) is detected in voltage 610 during the actual power state transition despite the dynamic pulse. Upon a subsequent similar transition from C3 to C0, a dynamic pulse of 150 mV is then generated. And no undershoot is detected. The specifications—magnitude of the pulse—has been dynamically tuned/adjusted to determine an optimal transient pulse. Although this example applies to dynamic tuning of pulse magnitude, the same tuning may be applied to any characteristic (duration, start time, etc) of a transient pulse.

Although FIGS. 5 and 6 have been discussed separately, it is important to note that a predictor and a sensor may be utilized together. As an example, a predictor may be utilized for power state changes and predicted changes in current demand, while a sensor is utilized as a catch-all for the cases where the predictor does not accurately predict a change in current demand. Furthermore, a predictor may predict a power state transition based on a request. And the predicted start of the power state transition may be augmented by actual sensor measurement of a change in current demand.

Figure 7:
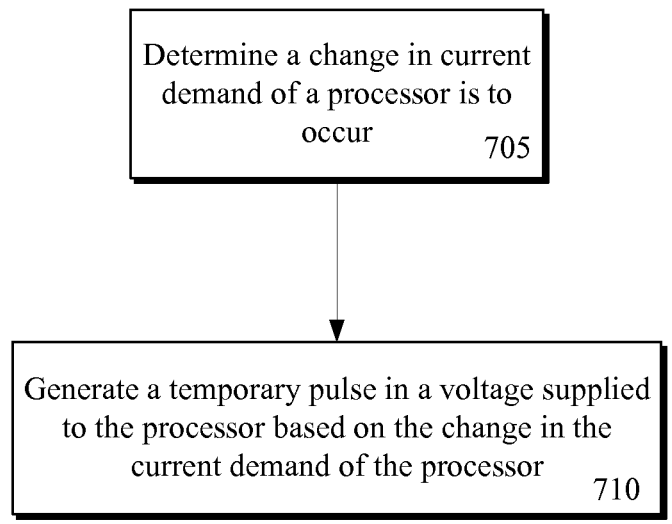
FIG. 7 illustrates an embodiment of a flow diagram for a method of generating a temporary pulse in supplied voltage.

Turning to FIG. 7, an embodiment of a flow diagram for a method of generating a temporary pulse is illustrated. In block 705, it is determined that a change in current demand of a processor is to occur. As discussed above, determining that a change in current demand of a processor is to occur may be done through actual measurement of a start in a change of current demand, a prediction that a change in current demand is to occur, or a combination thereof. For example, prediction includes detecting a request for a power state transition. Yet, such a power state transition may be measured through an actual change in current demand, while other current demand changes may be similarly measured.

In flow 710, a temporary pulse in a voltage supplied to the processor is generated. The temporary pulse, in one embodiment, is based on the change in current demand of the processor. Here, a temporary pulse above nominal is generated if the current demand increases. And the temporary pulse is below nominal if the current demand increases. In one embodiment, the specifications of the temporary pulse are related to/based on the change in current demand. For example, the greater the power state transition (i.e. the greater the change in current demand) the greater the size of the temporary pulse. In other words, to compensate for a larger change in current, a larger temporary pulse of voltage is supplied. The actual relation between the specifications for the change in current and the temporary pulse may be based on any function or algorithm.

Figure 8:
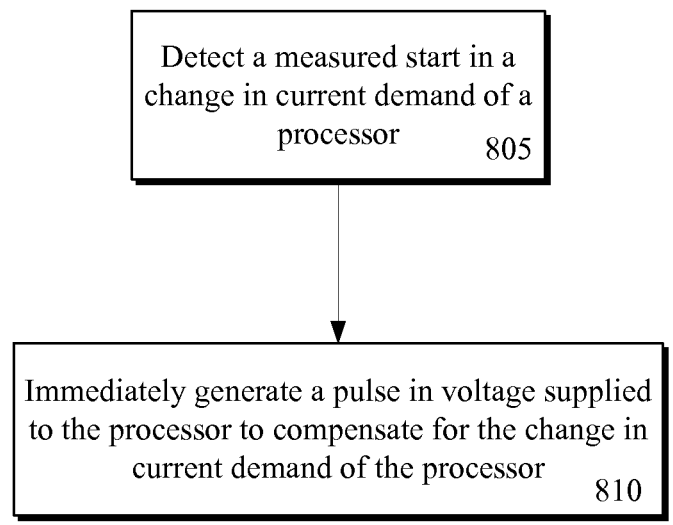
FIG. 8 illustrates another embodiment of a flow diagram for a method of generating a temporary pulse in supplied voltage.
Figure 9:
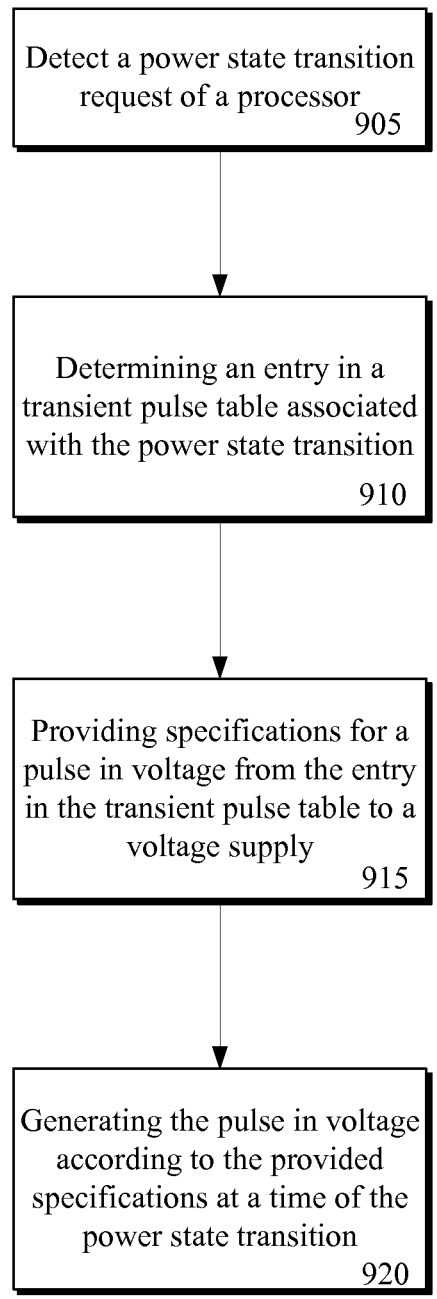
FIG. 9 illustrates another embodiment of a flow diagram for a method of generating a temporary pulse in supplied voltage.

Referring quickly to FIGS. 8-9, specific illustrative embodiments of flow diagrams for methods of generating a temporary pulse are depicted. At flow 805, a start of a change in current demand of a processor is measured. For example, when a power state transition is occurring or a workload is changing, the initial change in current demand is measured/detected. And to make sure the effect of the change in current demand is mitigated as much as possible, a temporary (transient) pulse is generated in the voltage supplied to the processor to compensate for the change in the current demand of the processor in flow 810.

Instead of the mitigation embodiment described in FIG. 8, FIG. 9 illustrates a flow diagram for a method of proactively supplying a pulse upon a power state transition. In flow 905, a power state transition request to a processor is detected, such as power state transition request from a software entity. In flow 910, an entry in a transient pulse table associated with the power state transition is determined. As an example, the transient pulse table is a lookup table indexed by representations of possible power state transitions. Any known search algorithm is utilized to determined the entry indexed by the current power state transition referenced by the request.

Once identified, the specifications (pulse magnitude, pulse duration, start time of the pulse, etc.) associated with the transient event in the entry are provided to a voltage supply for the processor in flow 915. The voltage supply using those specifications generates the pulse in the voltage in flow 920. As a result, the adverse impacts (reduced performance, wasted power consumption, and use of expensive capacitors)

of power state transitions on the voltage supply are mitigated by the temporarily altered voltage supply.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a voltage supply to provide a plurality of voltage levels to a device; and
   transient control logic coupled to the voltage supply, the transient control logic to:
      store a transient pulse table, the transient pulse table to include an entry storing a transient event associated with a pulse voltage level, a representation of a start time for a pulse that corresponds to a power state transition of the device, and an amount of time to sustain the pulse;
      receive a transient load event indicator referencing the transient event for the device, the transient event comprising the power state transition of the device;
      locate the entry stored in the transient pulse table corresponding to the transient event in response to receiving the transient load event indicator;
      provide a representation of the pulse voltage level and the amount of time to the voltage supply; and
      cause the voltage supply to provide the pulse away from a nominal voltage of the plurality of voltage levels for the amount of time in response to receiving the pulse voltage level and the amount of time from the transient control logic.

2. The apparatus of claim 1, further comprising transient event logic to generate the transient load event indicator in response to the transient event for the device, the transient event further comprising a measured variation in current demand by the device or an indication that current demand of the device is going to change.

3. The apparatus of claim 1, wherein the pulse away from the nominal voltage includes a pulse above the nominal voltage in response to the transient event including an increase in a current demand of the device and includes a pulse below the nominal voltage in response to the transient event including a decrease in a current demand of the device.

4. A system comprising:
   a processor comprising a power control unit to indicate the processor is to transition between power states;
   a voltage supply to provide a plurality of voltage levels to a device; and
   transient control logic coupled to the voltage supply, the transient control logic to:
      store a transient pulse table, the transient pulse table to include an entry storing a transient event associated with a pulse voltage level, a representation of a start time for a pulse that corresponds to a power state transition of the device, and an amount of time to sustain the pulse;
      receive a transient load event indicator referencing the transient event for the device, the transient event comprising the power state transition of the device;
      locate the entry stored in the transient pulse table corresponding to the transient event in response to receiving the transient load event indicator;
      provide a representation of the pulse voltage level and the amount of time to the voltage supply; and
      cause the voltage supply to provide the pulse away from a nominal voltage of the plurality of voltage levels for the amount of time in response to receiving the pulse voltage level and the amount of time from the transient control logic.

5. The system of claim 4, further comprising transient event logic to generate the transient load event indicator in response to the transient event for the device, the transient event further comprising a measured variation in current demand by the device, or an indication that current demand of the device is going to change.

6. The system of claim 4, wherein the pulse away from the nominal voltage comprises a pulse above the nominal voltage in response to the transient event corresponding to an increase in a current demand of the device and comprises a pulse below the nominal voltage in response to the transient event corresponding to a decrease in a current demand of the device.

7. A method comprising:
storing a transient pulse table, the transient pulse table to include an entry storing a transient event associated with a pulse voltage level, a representation of a start time for a pulse that corresponds to a power state transition of the device, and an amount of time to sustain the pulse;
receiving a transient load event indicator related to the transient event for a computing device, the transient event comprising the power state transition of the computing device;
locating the entry stored in the transient pulse table corresponding to the transient event in response to receiving the transient load event indicator;
providing a representation of the pulse voltage level and the amount of time; and
providing the pulse at the voltage level away from the nominal voltage to the computing device in response to receiving the pulse voltage level and the amount of time from the transient pulse table.

8. The method of claim 7, wherein the transient event is further comprises a measured variation in current demand by the computing device, or an indication that current demand of the computing device is going to change.

9. The method of claim 7, wherein the pulse away from the nominal voltage includes a pulse above the nominal voltage in response to the transient event corresponding to an increase in a current demand of the computing device and includes a pulse below the nominal voltage in response to the transient event corresponding to a decrease in a current demand of the computing device.

10. A method comprising:
receiving a transient load event indicator related to a transient event for a computing device, the transient event comprising a power state transition of the computing device;
generating a transient pulse table, the transient pulse table comprising an entry storing the transient event associated with a corresponding pulse voltage level and amount of time; and
providing a pulse at the voltage level away from the nominal voltage to the computing device in response to receiving the pulse voltage level and the amount of time from the transient pulse table, wherein the entry stores a representation of a start time for the pulse, which corresponds to the power state transition of the computing device.

11. The method of claim 10, wherein the transient event further comprises a measured variation in current demand by the computing device, or an indication that current demand of the computing device is going to change.

12. The method of claim 10, wherein the pulse away from the nominal voltage includes a pulse above the nominal voltage in response to the transient event corresponding to an increase in a current demand of the computing device and includes a pulse below the nominal voltage in response to the transient event corresponding to a decrease in a current demand of the computing device.

13. The method of claim 10, comprising:
locating the entry held in the transient pulse table corresponding to the transient event in response to receiving the transient load event indicator; and
providing a representation of the pulse voltage level and the amount of time to a voltage supply.

* * * * *